United States Patent
Fenster et al.

[11] Patent Number: 6,111,983
[45] Date of Patent: Aug. 29, 2000

[54] DETERMINATION OF IMAGE SHAPES USING TRAINING AND SECTORING

[75] Inventors: Samuel D. Fenster, New York, N.Y.; John R. Kender, Leonia, N.J.

[73] Assignee: The Trustees of Columbia University in the City of New York, New York, N.Y.

[21] Appl. No.: 09/001,238

[22] Filed: Dec. 30, 1997

[51] Int. Cl.[7] .............................. G06K 9/00; G06K 9/34; G06K 9/40; G06K 9/46

[52] U.S. Cl. ..................... 382/203; 382/173; 382/204; 382/181; 382/266

[58] Field of Search ................... 382/199, 173, 382/203, 204, 215, 217, 195, 181, 266

[56] References Cited

U.S. PATENT DOCUMENTS

| | | | |
|---|---|---|---|
| 5,233,670 | 8/1993 | Dufour | 382/197 |
| 5,458,126 | 10/1995 | Cline et al. | 600/425 |
| 5,644,656 | 7/1997 | Akra et al. | 382/215 |
| 5,768,413 | 6/1998 | Levin et al. | 382/173 |
| 5,845,009 | 12/1998 | Marks et al. | 382/203 |
| 5,862,245 | 1/1999 | Renouard et al. | 382/203 |
| 5,926,568 | 7/1999 | Chaney et al. | 382/203 |

OTHER PUBLICATIONS

Staib, et al "Boundary Finding with Parametrically Deformable Models",IEEE, vol. 14, No. 11, pp. 1061–1075,, Nov. 1992.

Staib, et al "Model–Based Deformable Surface Finding for Medical Images", IEEE, vol. 15, No. 5, pp. 720–731, Oct. 1996.

*Primary Examiner*—Phuoc Tran
*Assistant Examiner*—Daniel G. Mariam
*Attorney, Agent, or Firm*—Baker Botts LLP

[57] ABSTRACT

For enhanced accuracy in determining a shape in an image, a shape model can be trained for parameter settings, based on training data for which the desired shape is specified. Such training can be applied to models in which a shape is treated in a sectored fashion, with training applied to each of the sectors. The suitability of an objective function, obtained by training or otherwise, can be assessed by using near-correct shapes which are generated by randomly perturbing a ground-truth shape.

20 Claims, 4 Drawing Sheets

DETERMINATION OF IMAGE SHAPES USING TRAINING AND SECTORING

SPECIFICATION

The United States Government has certain rights in this invention pursuant to DOD/ONR MUR1 Grant N00014-95-1-0601 and ARPA Contract DACA-76-92-C-007.

TECHNICAL FIELD

This invention relates to automated image processing and, more particularly, to the determination of shapes such as boundaries, contours or edges in images.

BACKGROUND OF THE INVENTION

The task of determining shape boundaries in images arises in various fields including cartography, robotics and medical diagnostics, for example. Such tasks may be met by direct visual inspection, but, e.g. for processing large numbers of images, automated techniques are desired.

One such technique for shape determination involves iterative adjustment of a shape model such as a flexible line, called a "snake", with the goal of optimizing an objective function. For example, the line may be adjusted so that a parametric combination of its smoothness and the cumulative strength and proximity of nearby image edges is maximized. Analogous techniques can be used for higher-dimensional shapes, e.g. using a flexible surface for modeling the boundary of a spatial volume.

SUMMARY OF THE INVENTION

We have recognized that a shape model can be "trained" for parameter settings in an objective function, based on training data for which the correct shape is specified. In particular, such training can be applied advantageously to models in which a shape or boundary is treated in a sectored fashion, with training applied to each sector individually.

The effectiveness of parameter settings, as obtained from training or otherwise, can be assessed by using near-correct shapes which are generated by randomly perturbing a ground-truth shape.

DETAILED DESCRIPTION

Preferred techniques, which are described below in method terms, have been implemented as applications software in C++ for instructing a general-purpose processor, and the implementation has been tested on a SUN Workstation. Use of special-purpose firmware or hardware is not precluded, for enhanced computational efficiency.

A. Training

To find the boundary of a specific kind of object in a cluttered scene, a shape model should know what the object of interest looks like, in a way that differentiates the boundary of the object from the boundaries of nearby objects. If this is not known, in a preferred technique, a model can be trained as to what the object looks like.

Specifically, the model can be trained to find the likeliest value for each of a number of parameters associated with image features of the boundary of an object of interest. The selection of such features determines what function will be optimized in finding an object boundary.

A "deformable model" is a description of a shape which is iteratively adjusted until it best matches what is depicted in the image. "Best" is measured by an objective function or "energy" which is minimized. For the process of minimizing the energy, the term "force" has become accepted in the field.

In the case of a contour in a 2D image, the model is called a "snake". A snake can be used (i) to fit a continuous shape to discrete image data, (ii) to accommodate shape models that can change locally to conform to image details, (iii) to constrain global shape, and (iv) to incorporate prior local or global shape information in the objective function. Thus, it can be robust to locally bad data, yet can find local shape where data exists. It can respond to general image-processing cues such as edges, or to domain-specific information such as particular colors or textures.

There are domains where conventional snakes fail due to attraction to strongest or closest image edges which often are not the ones sought. This is the case in medical diagnostics, e.g. in images of lower abdominal organs pressed up against similar organs and against brighter, stronger-edged bone. In such cases, the wrong object may satisfy the objective function better than the correct one does.

If a structure whose contours are sought does not have features such as brightness or edge strength that are more extreme than those of the neighboring objects, the energy being minimized will need to have its parameters tailored to some domain-dependent intermediate value. This value can be found by statistical measurement, as a result of training based on a "ground-truth" training set. This is a collection of images, each with the desired contour correctly specified.

For the sake of specificity and without limiting the invention, the domain of interest in the following is that of prostate tumor diagnostics. In this domain, object contours in the human abdomen are sought to plan radiation treatments which will destroy tumors in the prostate. In such treatments, shaped beams of radiation converge on the tumor so as to give it maximum exposure while giving surrounding healthy tissue minimal exposure. Before beam shape and direction can be optimized, the layout of nearby organs must be known.

Conventionally, organs are outlined manually, slice by slice on computer tomography (CT) scans, sometimes with the help of simple edge-following algorithms. Such manually generated outlines can be used as ground truth, to train deformable contour models and to test the accuracy of the resulting models.

In experiments, median slices of the bladder were used. While this amounts to a small subset of available images, it did maintain the critical temporal and interpatient variations of interest. The possible proximity of a tumor gave the training data the same incidence of organ abnormalities as would be seen in the application of training results in the domain. The images were from a study in which patients had four images taken at different stages of treatment.

The generation of a model objective function based on learning from training data can be formalized in terms of image qualities to be observed and a probability distribution to be fitted to the qualities. In an image I, an object with shape S is sought. Quantitative criteria are selected which provide information about how S relates to I, with a function F(I, S) being defined to extract these quantities from I and S. To represent what values of F are "good", a probability density function (PDF) can be used, g(F(I, S)), recovered from training data and representing the density observed in the set of training data in the region of any specified vector of feature values F(I, S). The function g(F(I, S)) is an approximation for the probability P(F(I, S)). For its determination, a finitely parameterized representation can be used.

Once F has been picked, and a model has been adopted to represent g, a deformable model can be obtained by training. Ground truth is obtained from a set of images $I_1, \ldots, I_n$ of the desired object, with its correct outlines $S_1, \ldots, S_n$ in each image. Features from each pair $F(I_i, S_i)$, are the data from which the parameters of a continuous distribution g are found. The likeliest parameters are those defining a distribution that maximizes the joint probability of observing the features of the training set, $P(F(I_1, S_1) \wedge \ldots \wedge F(I_n, S_n))$. Under the assumption that the training data were drawn independently, g can be found as the function which maximizes the product of the $g(F(I_i, S_i))$.

For well-chosen F and model 9, the shape which maximizes this probability will also maximize P(I∧S), and thus also P(S|I), because P(I) is constant as S varies. In a Bayesian approach, this is the maximum-likelihood shape. A well-chosen feature function F is characterized in that correct shapes have feature vectors which are different from feature vectors of incorrect shapes. An adequately chosen probability model is characterized in that the recovered g is sufficiently flexible to have high values only for feature vectors commonly produced by correct shapes.

Figure 1:
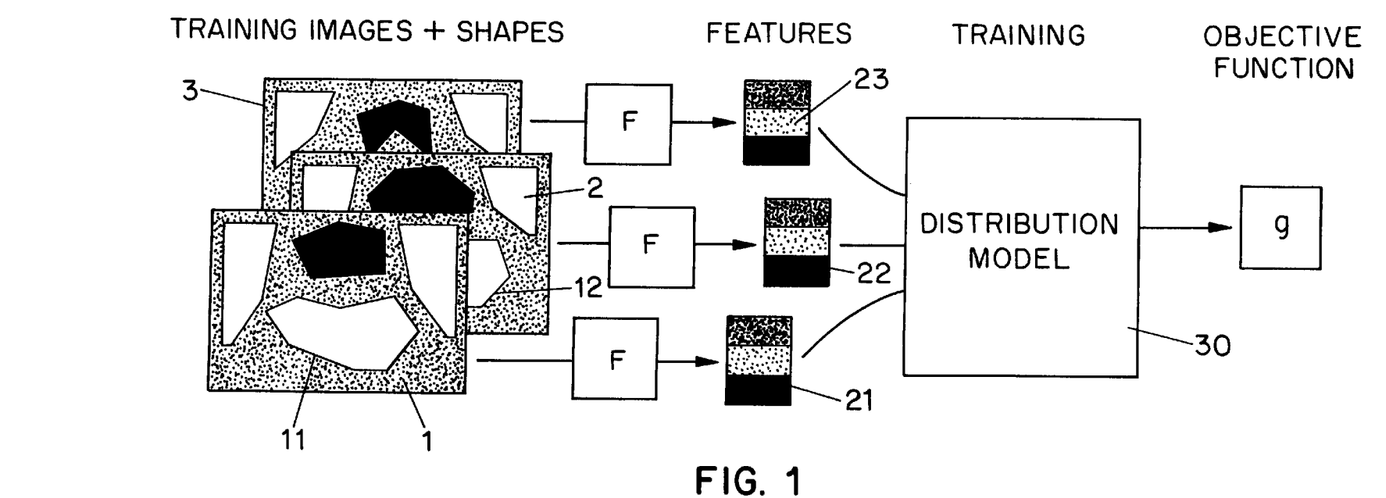
FIG. 1 is a diagram which illustrates automated generation of an objective function for shape determination, using training.

FIG. 1 illustrates how parameters for a model g can be found, from training images 1, 2 and 3 representing a set of training images. Each training image includes a representation of an object of interest which is delineated by a respective contour 11, 12 and 13 (not visible). From each of the training images, a set of characterizing feature values 21, 22 and 23 of the respective contour 11, 12 and 13 is extracted by the function F. The feature values 21, 22 and 23 are used in a training module 30 to determine parameter values in a specified model of the density of the expected feature values. The resulting objective function g includes the determined parameter values.

Figure 2:
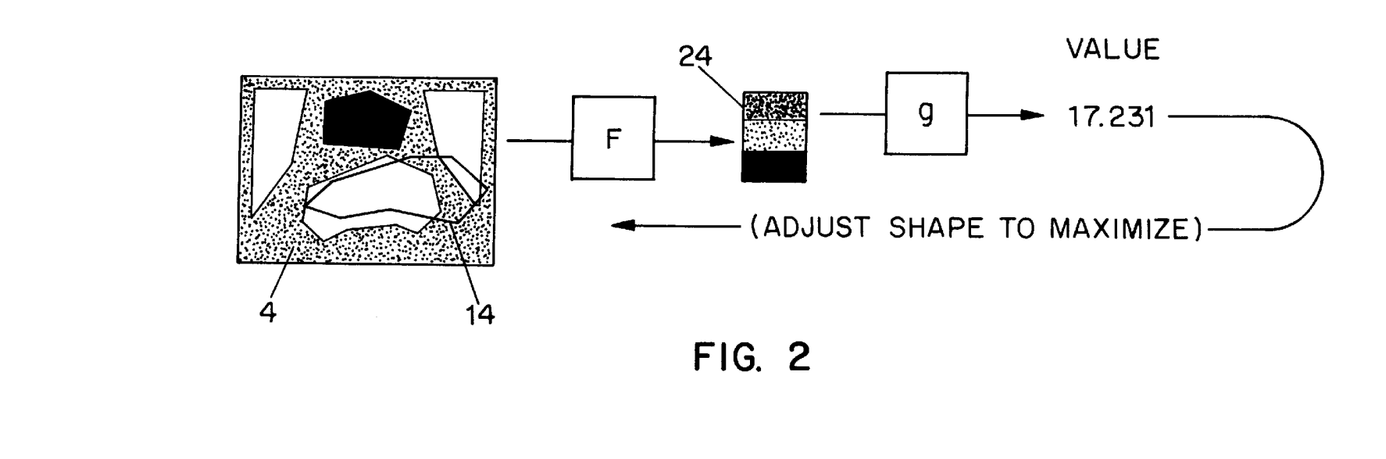
FIG. 2 is a diagram which illustrates automated shape determination using the objective function.

FIG. 2 illustrates how the resulting objective function g can be used in adjusting a shape 14 so that the adjusted shape more closely delineates the object of interest in a new image 4. The function F is used to extract the feature values 24 of the shape 14, and the function g is evaluated for the extracted feature values, giving a numerical value (such as 17.231, for example). After a systematic adjustment of the shape which is expected to have a higher g-value, the process is repeated until no adjustment is found which increases the value of g.

In the experiments for finding the bladder boundary in CT scans, the following choices were made: S was a closed polyline S(u). Image quantities were observed at a scale s, using a Gaussian-blurred image $I_s$. The shape's relation to the image was represented by image intensities, $I_s(S(u))$, and by directional image gradients normal to the shape, $S^{\perp}(u) \cdot \nabla I_s(S(u))$, where $S^{\perp}(u)$ is the normal to S(u). These features, measured along S at one-pixel intervals, can be taken as the output of F(I, S).

A multidimensional Gaussian distribution was used for both features, for training to recover the mean and standard deviation parameters of two Gaussian distributions $N(\mu_I, \sigma_I)$ and $N(\mu_\nabla, \sigma_\nabla)$. The joint probability of these two quantities at every point around the contour is the modeled probability of observing those features on a shape S in an image I, i.e. P(F(I, S)). This is a product of Gaussians whose negative logarithm represents "image energy". A single two-dimensional Gaussian taking covariance into account was also tested. Minimizing image energy is equivalent to maximizing P(F(I, S)). Well-known gradient descent minimization over shapes S can be used for numerical minimization.

In a cluttered domain, even such simple training provides a better-behaved objective function than does conventional snake energy which rewards contours for sitting on the strongest image edges. A trained contour seeks the relationship to image data that was observed in the training set. Training is effective if some aspect of this contour-image relationship is consistent across the training set, and is different for incorrect contours.

B. Sectoring

The qualities that a model is taught to seek by training need not be uniform everywhere on its boundary. For example, in abdominal CT scans, the bladder may be in contact with the pelvis on the sides, with male seminal vesicles at two regions near the back, with the rectum directly behind, and with tissue fluid elsewhere. Thus, its boundary characteristics vary with position, with differing degrees of variability at different places. Preferably, the objective function should vary spatially, with respect to its maximum and also with respect to sensitivity, for robustness where wide variation is expected. These needs can be met by sectored snakes, with the objective function being sector dependent.

To this end, in an experiment, the contour was divided into a fixed number of equal-length sectors, each with separate training. This allows the snake to be attracted to different conditions where expected, and permits stronger objective function response in regions where there is less variability in conditions between images. To obtain regions that roughly correspond among training contours, and between training data and images to be processed, an origin for the start of the first sector was selected at "twelve o'clock". The number of sectors was 12, considered as being sufficiently large to capture the number of different types of regions around the bladder.

As compared with global optimization as described above, there now is a pair of Gaussians for each sector: $N(_k\mu_I, {}_k\sigma_I)$ and $N(_k\mu_\nabla, {}_k\sigma_\nabla)$. The image energy still has a scale parameter s so that the image qualities it responds to are in a Gaussian-blurred image $I_s$.

The larger the number of sectors, k, the better their training approximates a continuously varying probability distribution of image qualities around the shape boundary. But with more sectors, each sector receives less exposure to a statistically representative variety of the surroundings in the image, and thus receives poorer training.

Figure 3A:
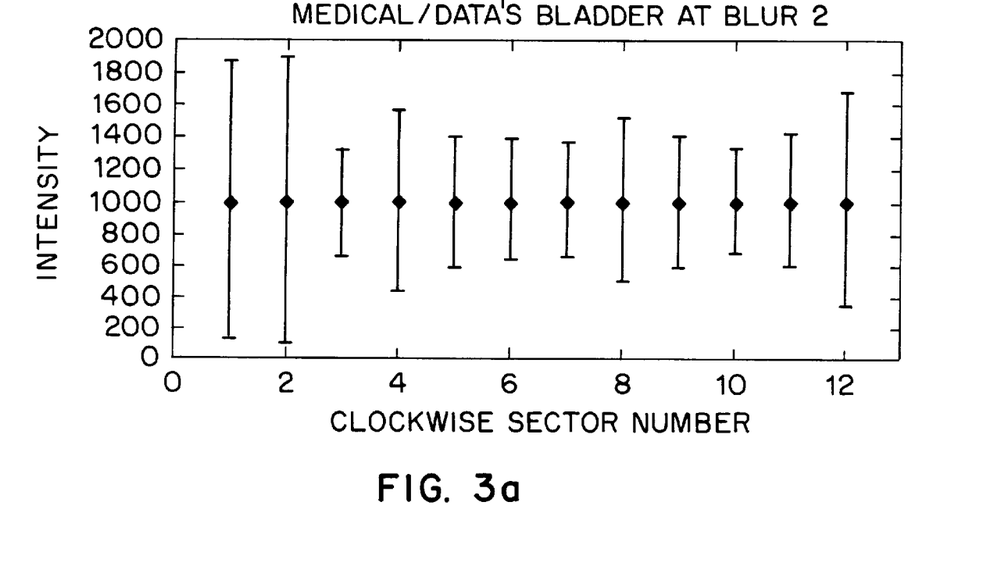
FIGS. 3a and 3b are graphical representations of image intensity and directional gradient, respectively, versus sector number in an example of a sectored snake.
Figure 3B:
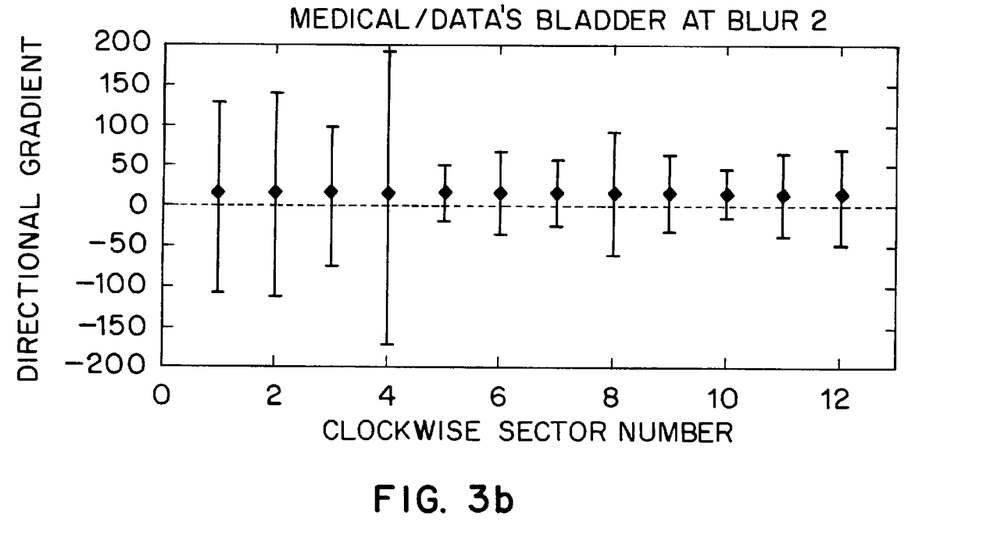

FIGS. 3a and 3b represent joint Gaussians, respectively of image intensity and intensity gradient in the normal to snake direction. These were determined separately by training, for each of 12 sectors of a sectored snake. It is significant to observe that the intensity bars, in FIG. 3a, are tallest in regions 12, 1 and 2, corresponding to greatest intensity variability at the top of the bladder. Thus, because of the wide range of intensities in that region in the training images, a snake with this data will not be as strongly attracted to any particular intensity value at the top of the bladder than elsewhere.

C. Assessment of Suitability of a Model

Once an objective function has been arrived at, by training or otherwise, it is desirable to determine as to whether it meets certain basic desiderata. In particular, the objective function must reach its optimum for the correct shape and, if a descent method is used for optimization, its value must get monotonically closer to the optimum as the correct shape is approached.

A statistical characterization of the behavior of an objective function can be obtained as follows: Within an image, a ground-truth shape is perturbed to result in a set of contours which deviate from the ground truth to different degrees. For perturbation of a ground-truth shape, normally distributed first-order deformations can be used, for example. For each of the perturbed shapes, the value of a measure is obtained for how far the perturbed shape is from the ground-truth shape. As one such measure, the chamfer distance is defined as the average over one shape, of distance to the closest point on the other. Other known measures which can be used include the Hausdorff distance and the area of the symmetric difference of the enclosed regions.

The relationship between objective function values and distance to ground truth over the set of perturbed shapes is indicative of the suitability of the function. This relationship can be represented by a scatter plot, for visual inspection. For example, in such a plot, tight clustering around an increasing function indicates that a shape that decreases its energy actually brings it closer to ground truth.

There are various ways the relationship can be quantified. One is by calculating the correlation coefficient—the closer it is to +1, the more favorably this reflects on the choice of object function. Another suitable statistic is the number of contours having energies below that of the ground truth, thus falsely giving the appearance that they are better solutions than the correct one. To rate the performance of an objective function, statistics of plots from many images must be aggregated.

Figure 4A:
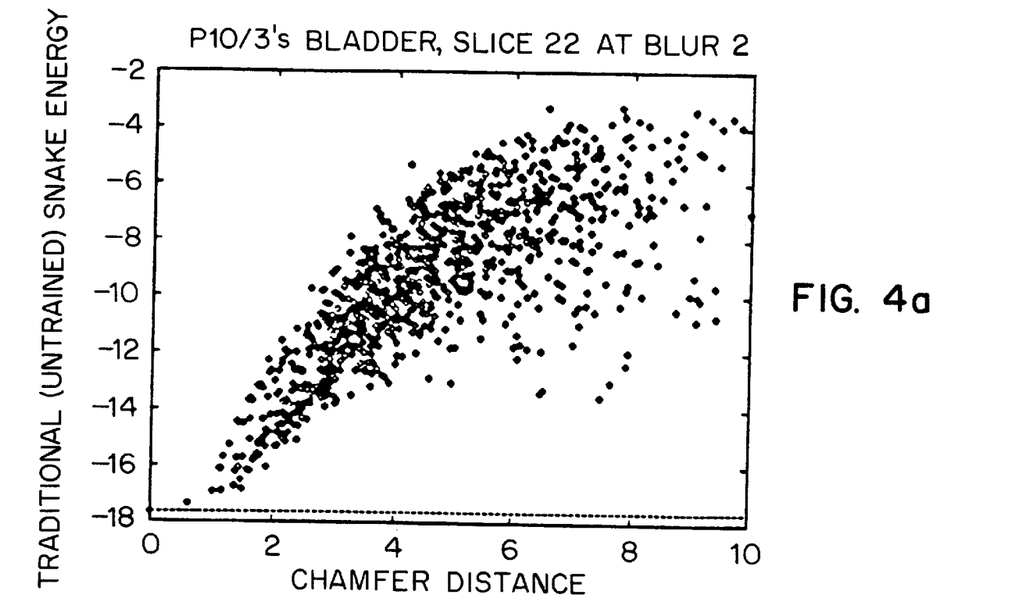
FIGS. 4a and 4b are examples of scatter plots as used in statistical evaluation, illustrating different degrees of correlation and numbers of false positives.
Figure 4B:
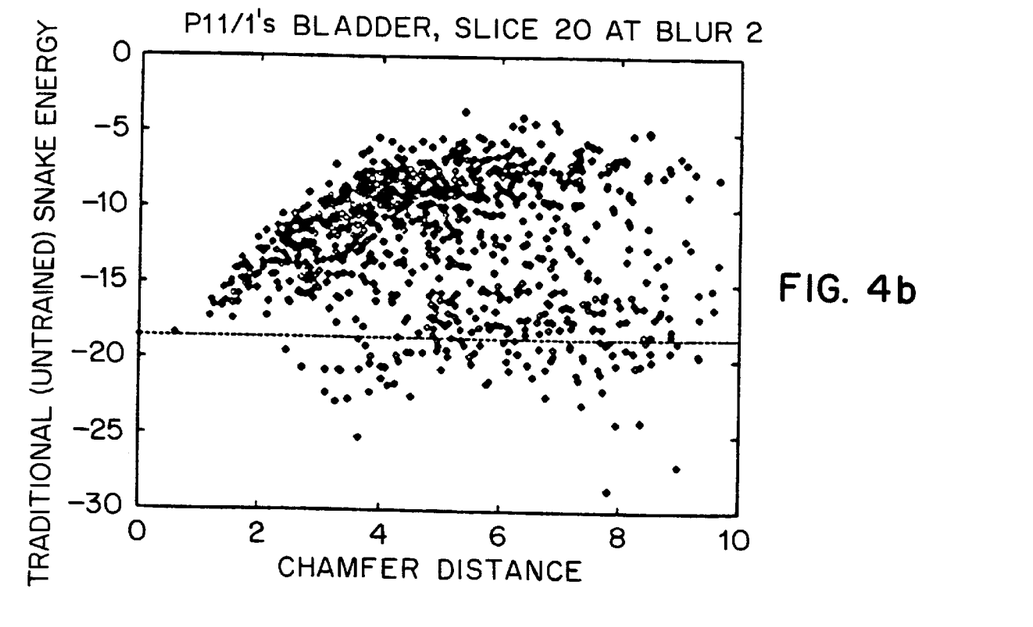

FIG. 4a illustrates a high-correlation (0.73) scatter plot with no false positives, for an image of a patient's bladder. By contrast, the scatter plot of FIG. 4b illustrates low correlation (−0.04), and 8.8% false positives (below the dotted line).

D. Results

Figure 5A:
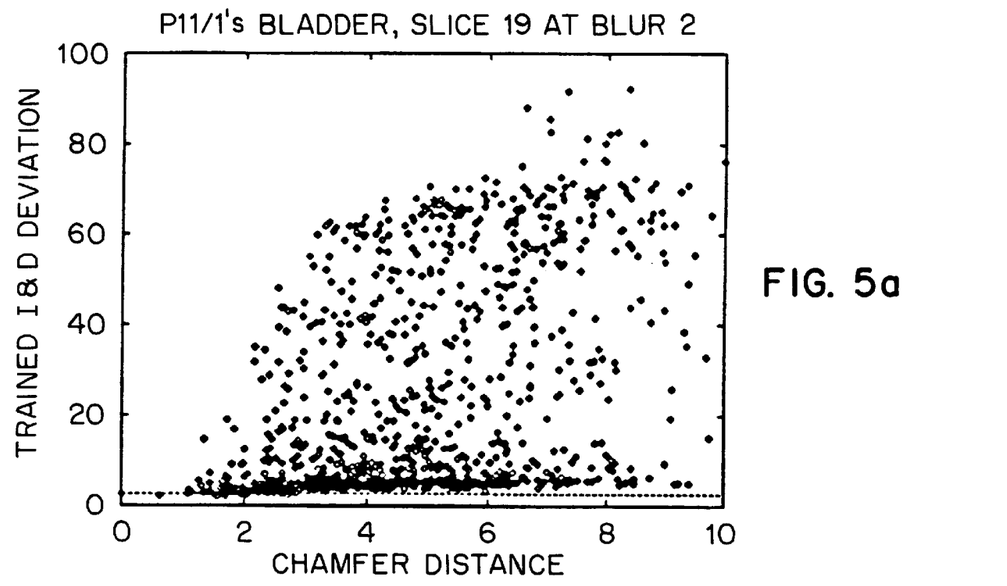
FIGS. 5a and 5b are examples of scatter plots for an unsectored and a sectored snake, respectively.
Figure 5B:
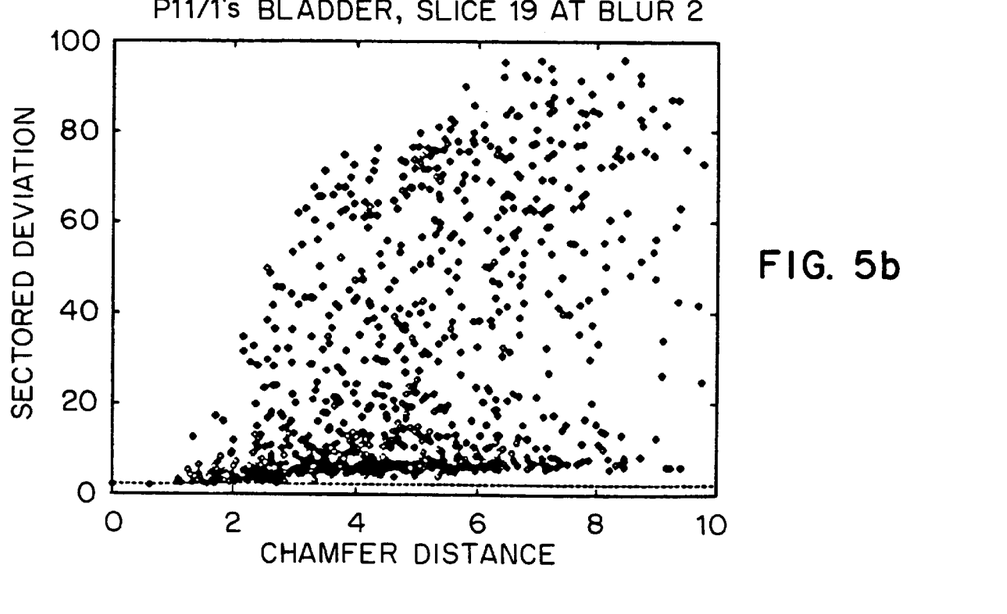

The scatter plots shown in FIGS. 5a and 5b are for two objective functions, obtained on the same data set by unsectored and sectored training, and applied to contours in the same image. The respective correlations are 0.43 and 0.48, and the respective rates of false positives are 1.1% and 0.3%.

As training data, 36 hand-outlined 2D images of bladders from 24 abdominal 3D CT scans of seven patients were used. For determining the contour of the bladder, three methods were used, namely (i) a prior-art, untrained snake whose energy is gradient strength traversed by the contour, (ii) a simple trained model as in A. above, and (iii) the sectored snake as in B. above. Each of the tests was carried out at two different scales, namely s=2 and s=4. Thus, six different objective functions were used.

For testing, to characterize the behavior of the objective functions statistically, the ground-truth shape within an image was perturbed randomly to produce contours which were deformed to varying degrees. One thousand normally distributed first-order perturbations of the contour were used, each combining a translation and a scaling independently around two randomly chosen orthogonal axes centered on the centroid of the contour. The translations and the logarithms of the scaling were normally distributed with standard deviations of 5 pixels and log(1.1), respectively, the latter corresponding to 10 percent stretching/shrinkage.

To measure how far a shape deviates from the ground-truth shape, chamfer distance was used. Two statistics were obtained from the results, namely (1) the degree of correlation between a contour's image energy and its distance from the image's ground-truth contour and (2) the number of perturbed contours whose image energy is lower than that of the unperturbed ground-truth contour (i.e. the number of "false positives").

Corresponding experimental results are summarized in Tables 1 and 2. Table 1 shows that the sectored snake's energy was slightly better correlated to shape correctness than the unsectored snake, and was much better than a prior-art snake. Table 2 shows that the trained snakes outperformed the prior-art snake with respect to false positives (FP), with the sectored snake decisively outperforming the snake with unsectored training.

Table 3 shows what portion of the 36 image slices met progressively more relaxed standards (i.e., number of false positives allowed) for each energy function. For instance, 72% of the image slices had fewer than 2 in 1000 bladder contour perturbations with lower sectored-snake energies than the truth. Only 28% of the images had so few false positives with the conventional snake energy.

TABLE 1

| objective function | scale | average correlation | deviation of correlation |
|---|---|---|---|
| sectored, trained | 2 | 0.56 | 0.12 |
| | 4 | 0.61 | 0.13 |
| unsectored, trained | 2 | 0.55 | 0.14 |
| | 4 | 0.58 | 0.14 |
| untrained | 2 | 0.15 | 0.33 |
| | 4 | 0.21 | 0.37 |

TABLE 2

| objective function | scale | average FPs | deviation |
|---|---|---|---|
| sectored, trained | 2 | 0.6% | 0.8% |
| | 4 | 5.8% | 6.4% |
| unsectored, trained | 2 | 1.1% | 1.6% |
| | 4 | 10.9% | 10.9% |
| untrained | 2 | 15.4% | 14.5% |
| | 4 | 23.2% | 16.9% |

TABLE 3

| objective function | scale | no FP | FP < .2% | FP < 2% | FP < 5% |
|---|---|---|---|---|---|
| sectored, trained | 2 | 53% | 72% | 94% | 97% |
| | 4 | 8% | 11% | 56% | 72% |
| unsectored, trained | 2 | 42% | 72% | 89% | 92% |
| | 4 | 8% | 14% | 31% | 56% |
| untrained | 2 | 14% | 28% | 33% | 42% |
| | 4 | 14% | 22% | 31% | 33% |

We claim:

1. A method for generating an objective function for a deformable model of a shape boundary, comprising:

dividing the model of the shape boundary into a plurality of sectors;

selecting, for each one of the plurality of sectors of the model of the shape boundary, a continuous model of feature value density for at least one feature of the boundary;

applying corresponding sectors of a plurality of training images to the plurality of sectors of the model of the shape boundary, each one of the corresponding sectors of the plurality of training images representing ground truth of corresponding sectors of the shape boundary;

obtaining, from each of the corresponding sectors of the plurality of training images and for each of the sectors of the model of the shape boundary corresponding thereto, a feature value for at least one preselected feature, resulting in a respective distribution of feature values for each of the sectors of the model of the shape boundary;

deriving, for each of the sectors of the model of the shape boundary, a distribution function from the continuous model and the respective plurality of feature values; and using the derived distribution functions in generating a sector dependent objective function.

2. The method according to claim 1, wherein the continuous model is Gaussian.

3. The method according to claim 1, wherein the continuous model is multi-dimensional, representing multiple features.

4. The method according to claim 3, wherein the continuous model is Gaussian.

5. The method according to claim 1, wherein the boundary is the contour of a two-dimensional shape.

6. The method according to claim 1, wherein the feature is an image feature.

7. The method according to claim 6, wherein the image feature is visual intensity.

8. The method according to claim 6, wherein the image feature is visual intensity gradient perpendicular to image shape.

9. The method according to claim 1, wherein the feature is a shape feature.

10. The method according to claim 9, wherein the shape feature is boundary smoothness.

11. A system for venerating an objective function for a deformable model of a shape boundary, comprising a processor which is instructed for:

dividing the model of the shape boundary into a plurality of sectors;

selecting, for each of the plurality of sectors of the model of the shape boundary, a continuous model of feature value density for at least one feature value of the boundary;

applying corresponding sectors of a plurality of training images to the plurality of sectors of the model of the shape boundary, each of the corresponding sectors of the plurality of training images representing around truth of corresponding sectors of the shape boundary;

obtaining, from each of the corresponding sectors plurality of training images and for each of the sectors of the model of the shape boundary corresponding thereto, a feature value for at least one preselected feature, resulting in a respective distribution of feature values for each of the sectors of the model of the shape boundary;

deriving, for each of the sectors of the model of the shape boundary, a distribution function from the continuous model and the respective plurality of feature values; and using the derived distribution functions in generating a sector dependent objective function.

12. A system for generating an objective function for a deformable model of a shape boundary, comprising:

means for dividing the model of the shape boundary into a plurality of sectors;

means for selecting, for each of the plurality of sectors of the model of the shape boundary, a continuous model of feature value density for at least one feature of the boundary;

means for applying corresponding sectors of a plurality of training images to the sectors of the model of the shape boundary, each of the corresponding sectors of the plurality of training images representing ground truth of corresponding sectors of the shape boundary;

means for obtaining, from each of the corresponding sectors of the plurality of training images and for each of the sectors of the model of the shape boundary corresponding thereto, a feature value for at least one preselected feature, resulting in a respective distribution of feature values for each of the sectors of tile model of the shape boundary;

means for deriving, for each of the sectors of the model of the shape boundary, a distribution function for the continuous model and the respective plurality of feature values; and means for using the derived distribution functions in generating a sector dependent objective function.

13. A method for rating an objective function for a deformable model of a specified shape boundary, comprising:

generating a plurality of perturbed boundaries which differ from the specified shape boundary to different degrees;

evaluating the objective function for each of the perturbed boundaries; and statistically analyzing how the objective function values are related to the degree of difference between the specified shape boundary and the perturbed boundaries.

14. The method according to claim 13, wherein generating the perturbed boundaries comprises applying normally distributed first-order deformations to the specified shape boundary.

15. The method according to claim 13, wherein the degree of difference between the specified shape boundary and each of the perturbed boundaries is determined by chamfer distance.

16. The method according to claim 13, wherein statistically analyzing comprises using a scatter plot.

17. The method according to claim 13, wherein statistically analyzing comprises calculating a correlation coefficient.

18. The method according to claim 13, wherein statistically analyzing comprises counting false positives.

19. A system for rating an objective function for a deformable model of a specified shape boundary, comprising a processor which is instructed for:

generating a plurality of perturbed boundaries which differ from the specified shape boundary to different degrees;

evaluating the objective function for each of the perturbed boundaries; and statistically analyzing how the objective function values are related to the degree of difference between the specified shape boundary and the perturbed boundaries.

20. A system for rating an objective function for a deformable model of a specified shape boundary, comprising:

means for generating a plurality of perturbed boundaries which differ from the specified shape boundary to different degrees;

means for evaluating the objective function for each of the perturbed boundaries; and means for statistically analyzing how the objective function values are related to the degree of difference between the specified shape boundary and the perturbed boundaries.

* * * * *

UNITED STATES PATENT AND TRADEMARK OFFICE
CERTIFICATE OF CORRECTION

PATENT NO.    : 6,111,983
DATED         : August 29, 2000
INVENTOR(S)   : Samuel D. Fenster It is certified that error appears in the above-identified patent and that said Letters Patent is hereby corrected as shown below:

Column 7,
Line 37, "venerating" should read -- generating --
Line 49, "around" should read -- ground --
Line 51, "sectors plural-" should read -- sectors of the plural- --

Column 8,
Line 15, "tile" should read -- the --

Signed and Sealed this

Third Day of December, 2002

JAMES E. ROGAN
*Director of the United States Patent and Trademark Office*